Dec. 8, 1959  G. P. WOOLF ET AL  2,915,781
CRAB MEAT EXTRACTOR
Filed Jan. 7, 1957

INVENTOR.
George P. Woolf
Robert G. Woolf
BY
A. Schapp
ATTORNEY

2,915,781

CRAB MEAT EXTRACTOR

George P. Woolf and Robert G. Woolf,
San Francisco, Calif.

Application January 7, 1957, Serial No. 632,709

4 Claims. (Cl. 17—2)

The present invention relates to improvements in a crab meat extractor, and its principal object is to provide a labor-saving machine which extracts the meat from crab bodies mechanically and eliminates hand work, which is laborious and consists of hand-picking or hand-shaking.

More particularly, it is proposed to provide a rotary drum, with a perforated peripheral rim and formed with means for elevating the crab bodies fed thereinto to the top of the drum, and for dropping the same upon the bottom of the drum and intervening bodies, whereby the crab bodies are broken into fragments of meat and shell adapted for discharge through the perforated rim when reduced to proper size.

It is further proposed to provide, in connection with the said extractor, a means for separating the juices of the meat extruded from the same in the breaking-up process, and for collecting the juices in separate vessels, so as to render the same available for use in subsequent canning operations.

It is further contemplated, in one form of our invention, to incorporate the juice separator directly in the drum, so that the juices are caught and stored automatically, incident to the breaking-up process.

Further objects and advantages of our invention will appear as the specification proceeds, and the new and useful features of our crab meat extractor will be fully defined in the claims attached hereto.

The preferred forms of our invention are illustrated in the accompanying drawing, in which:

Figure 1 shows a side view of our crab meat extractor, with portions shown in section;

Figure 2, an end view of the same with portions shown in section;

Fig. 3, a detail sectional view of a modified form of vane, with a juice-catching attachment, the vane being shown in horizontal position; and Figure 4, a similar view showing the vane in vertical position, Figure 5 a fragmentary cross-section showing a modified drum construction.

While we have shown only the preferred forms of our invention, it should be understood that various changes or modifications may be made within the scope of the claims hereto attached, without departing from the spirit of the invention.

Referring to the drawing in detail, the drum 1 is suitably supported in a rectangular frame 2 having legs 3 in the corners thereof and carrying two spaced horizontal frame members 4 with bearings 5 on which the drum is supported with freedom of rotary movement on a horizontal axis.

The drum comprises two spaced and parallel side walls 6 annular in shape, and a peripheral rim 7, which is perforated uniformly, as shown. In its preferred form, the drum may be approximately three feet in diameter and a foot wide, and the perforations one inch in size.

The central portions of the sides of the drum are formed with openings approximately nine inches in diameter and the borders of the openings have outwardly projecting annular flanges 8 revolvably seated in the bearings 5.

The side walls 6 of the drum are held in spaced relation by the peripheral rims and also by a number of cross-bolts 9' traversing the drum substantially midway the radius thereof. The cross-bolts also serve to aid in breaking up the crab bodies.

The drum has a series, preferably four, of radial blades or vanes 9 which project from the peripheral rim inwardly, to a depth of approximately six inches and extend transversely through the full width of the drum.

A suitable chute 10 leads to one of the side openings of the drum for discharging the crab bodies thereinto.

The drum may be revolved, at slow speed, approximately 25 r.p.m., by any suitable means, as by the belt 11 driven by the motor 12.

A pan 13 is mounted underneath the drum, and this pan is somewhat wider than the drum, as shown in Figure 2, and considerably longer than the diameter of the drum, so as to extend beyond the drum in both directions.

The pan 13 comprises a rectangular bottom 14, side members 15 and end members 16 rising from the edges of the bottom and a screen floor 17 removably supported in slightly spaced relation to the bottom, as on cleats 18.

The total depth of the pan may be approximately eight inches and the spacing of the screen floor above the bottom about one inch. The mesh of the screen floor is relatively small, yet enough to allow the meat juice to pass therethrough while arresting solid particles.

The screen floor is provided with suitable handles 19 whereby it may be lifted out of the pan when filled with crab meat.

In operation:

The drum is first filled with crab bodies, from which the legs have been removed, to a certain height, say about one-half full, and is then set in revolving motion at relatively slow speed. Feeding is continued about as fast as one man, grabbing three or four crab bodies at a time, can throw the same into the chute. It will be seen that due to the angularity of the chute and the narrowness of the drum, the crab bodies fed through the chute will naturally distribute themselves throughout the length of the drum.

The blades or vanes 9, as they pass through the lower region of the drum, push the outer peripheral layer of crab bodies to follow the rotary movement of the drum rim and to ascend with the rim into the upper part of the drum until they spill over the edge of the vanes and drop down upon the lower portion of the drum, or upon bodies lying thereon.

In this process, due to the striking of the falling bodies, vibration and concussion, the bodies are broken up and the crab meat is separated from the shells.

When the particles of meat and shell are small enough to pass through the perforations of the rim of the drum, they are discharged automatically, most of the discharge taking place in regions approximately 45 degrees forwardly and rearwardly of the bottom of the drum.

The discharged particles drop into the pan 13 and come to rest on the screen floor above the bottom of the pan. While the particles accumulate on the screen, any juice present in the meat will pass through the screen and collect in the bottom of the pan.

As the meat accumulates in the pan, it may be removed by lifting the screen floor and dumping the load, and the liquid may thereafter be removed by pouring it out of the pan.

The solids are then deposited in a salt brine solution which causes the shells to sink and the crab meat to float, a small wire sieve may be used to collect the floating meat.

In case it is desired to catch the meat juices, or a substantial portion thereof, during the agitation process in the drum, the vanes 9 may be modified as shown in Figures 3 and 4.

For this purpose, each vane is formed with a central slot 20 extending from one side of the drum to the other and a semi-circular trough 21 is pivoted in the sides of the drum, as at 22, so as to be adapted for revolving movement in the slot.

The top of the trough 21 is covered by a screen 23 allowing the juice to pass therethrough while barring the solid matter. The trough is made to retain its horizontal position, with the opening facing upward by any suitable means, as by a weighted bottom indicated at 24.

Figure 3:
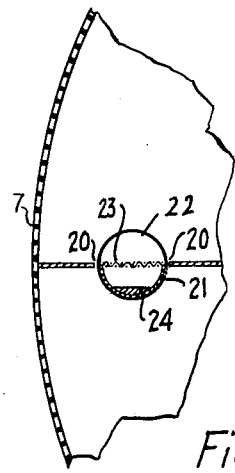
Figure 3 shows the vane on its upward course, in midway position, and at this time the screen of the trough is located in the plane of the blade, as shown.
Figure 4:
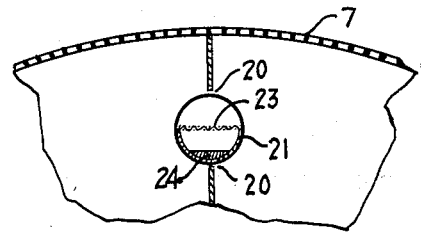
Figure 4 shows the vane in vertical position, that is, at the end of the upward travel, and the trough still occupies a horizontal position, with the screen arranged transversely to the blade.
Figure 5:
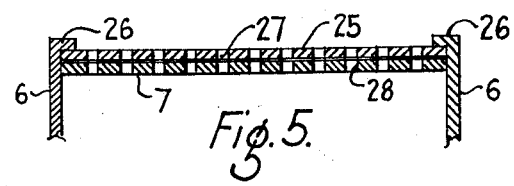
Figures 1, 2:
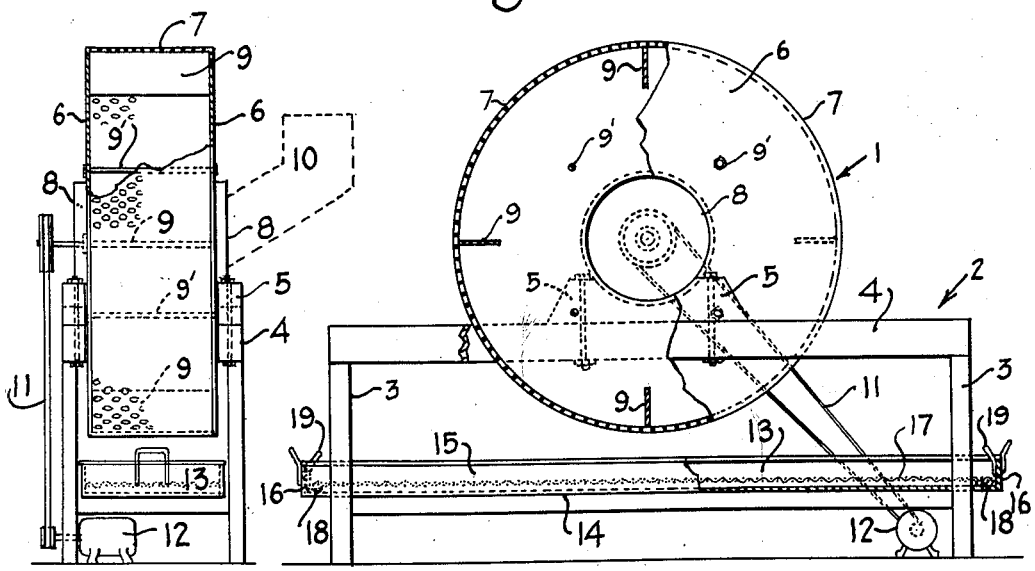

In Figure 5 a modification is shown to make the perforations in the peripheral rim 7 adjustable to different sizes in order to produce meat particles of different sizes to satisfy sectional requirements. In this form a second perforated rim 25 is superimposed upon the first rim 7, the second rim being adjustably held in flanges 26 projecting inwardly from the sides of the drum to bring the perforations partly or wholly in registry.

In this case the perforations in the two rims may be made somewhat larger, say about two inches in diameter, so that the active port area of the perforations may be adjusted over a wide range, from two inches to any desired minimum.

We claim:

1. In a crab meat extractor, a drum having spaced end walls and a perforated rim, the drum being relatively short axially and having a diameter substantially three times its length and the rim having small, substantially circular perforations uniformly distributed over the same, means associated with the drum for mounting the drum with freedom of revolving motion about a horizontal axis, means connected to the drum for revolving the drum, an inclined chute mounted for axial delivery of crab bodies into the drum substantially through the length thereof, and straight radial vanes of uniform width approximately equal to one-sixth of the diameter of the drum extending inwardly from the rim of the drum and operative for lifting the crab bodies on their upward course as the drum is rotated and for dropping the same from the top of the drum toward the bottom of the same for breaking up the bodies into meat and shell particles sized for escape through the rim perforations, the drum having means revolvable therewith for catching meat juices liberated during the operation.

2. In a crab meat extractor, a drum having spaced end walls and a perforated rim, the drum being relatively short axially and having a diameter substantially three times its length, and the rim having small, substantially circular perforations uniformly distributed over the same, means associated with the drum for mounting the drum with freedom of revolving motion about a horizontal axis, means connected to the drum for revolving the drum, an inclined chute mounted for axial delivery of crab bodies into the drum substantially through the length thereof, and straight radial vanes of uniform width approximately equal to one-sixth of the diameter of the drum extending inwardly from the rim of the drum and operative for lifting the crab bodies on their upward course as the drum is rotated and for dropping the same from the top of the drum toward the bottom of the same for breaking up the bodies into meat and shell particles sized for escape through the rim perforations, the vanes having means incorporated therein for catching meat juices liberated during the operation.

3. In a crab meat extractor, a drum having spaced end walls and a perforated rim, the drum being relatively short axially and having a diameter substantially three times its length and the rim having small, substantially circular perforations uniformly distributed over the same, means associated with the drum for mounting the drum with freedom of revolving motion about a horizontal axis, means connected to the drum for revolving the drum, an inclined chute mounted for axial delivery of crab bodies into the drum substantially through the length thereof, and straight radial vanes of uniform width approximately equal to one-sixth of the diameter of the drum extending inwardly from the rim of the drum and operative for lifting the crab bodies on their upward course as the drum is rotated and for dropping the same from the top of the drum toward the bottom of the same for breaking up the bodies into meat and shell particles sized for escape through the rim perforations, the vanes having screen troughs suspended therein for catching meat juices liberated during the operation.

4. In a crab meat extractor, a drum having spaced end walls and a perforated rim, the drum being relatively short axially and having a diameter substantially three times its length and the rim having small, substantially circular perforations uniformly distributed over the same, means associated with the drum for mounting the drum with freedom of revolving motion about a horizontal axis, means connected to the drum for revolving the drum, an inclined chute mounted for axial delivery of crab bodies into the drum substantially through the length thereof, and straight radial vanes of uniform width approximately equal to one-sixth of the diameter of the drum extending inwardly from the rim of the drum and operative for lifting the crab bodies on their upward course as the drum is rotated and for dropping the same from the top of the drum toward the bottom of the same for breaking up the bodies into meat and shell particles sized for escape through the rim perforations, the vanes having screen troughs suspended therein for catching meat juices liberated during the operation and the troughs having means associated therewith for maintaining the troughs in horizontal position while the drum rotates.

References Cited in the file of this patent

UNITED STATES PATENTS

| | | |
|---|---|---|
| 329,608 | Wicks | Nov. 3, 1885 |
| 1,276,984 | Sperlich | Aug. 27, 1918 |
| 2,129,452 | Van Sickle | Sept. 6, 1938 |
| 2,640,223 | Secor | June 2, 1953 |
| 2,652,588 | Harris | Sept. 22, 1953 |
| 2,734,537 | Geisler | Feb. 14, 1956 |

FOREIGN PATENTS

| | | |
|---|---|---|
| 643,383 | France | Mar. 15, 1928 |